(12) United States Patent
Cambon et al.

(10) Patent No.: US 7,629,408 B2
(45) Date of Patent: Dec. 8, 2009

(54) TIRE TREAD

(75) Inventors: Stéphanie Cambon, Chamalieres (FR); Didier Vasseur, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 569 days.

(21) Appl. No.: 11/336,196

(22) Filed: Jan. 20, 2006

(65) Prior Publication Data

US 2006/0116457 A1    Jun. 1, 2006

Related U.S. Application Data

(63) Continuation of application No. PCT/EP2004/008079, filed on Jul. 20, 2004.

(30) Foreign Application Priority Data

Jul. 21, 2003    (FR) .................................. 03 08891

(51) Int. Cl.
*C08K 3/34*    (2006.01)

(52) U.S. Cl. ........................ 524/492; 524/430; 524/495

(58) Field of Classification Search ................. 524/492, 524/495, 430

See application file for complete search history.

(56) References Cited

U.S. PATENT DOCUMENTS

| | | | | |
|---|---|---|---|---|
| 5,798,408 A | * | 8/1998 | Zanzig et al. | ................ 524/505 |
| 7,199,175 B2 | * | 4/2007 | Vasseur | ...................... 524/492 |

FOREIGN PATENT DOCUMENTS

| | | |
|---|---|---|
| EP | 0 501 227 A | 9/1992 |
| EP | 0 863 182 A | 9/1998 |
| EP | 1 122 281 A | 8/2001 |
| WO | WO 02/10269 A | 2/2002 |

* cited by examiner

Primary Examiner—Edward J Cain
(74) Attorney, Agent, or Firm—Cohen, Pontani, Lieberman & Pavane LLP

(57) ABSTRACT

A tire tread comprising a rubber composition based on at least a diene elastomer, a reinforcing inorganic filler such as silica, an inorganic filler/elastomer coupling agent and carbon black in a very small quantity, in an amount of between 0.05 and 2.0 phr. The tires comprising such a tread have, after photo-oxidation treatment of the latter, a significantly improved grip on wet roads. Such photo-oxidizing treatment, in particular under visible UV radiation, may advantageously be performed during the manufacture of the treads or tires itself, in the uncured state or after vulcanization, or even later on in the life of said tires.

44 Claims, No Drawings

TIRE TREAD

This application is a U.S. Continuation Application of International Application PCT/EP2004/008079 filed Jul. 20, 2004.

The present invention relates to tire treads comprising rubber compositions reinforced by an inorganic filler such as silica.

It relates more particularly to treads reinforced majoritarily with an inorganic filler and comprising carbon black in a minority proportion.

It is known that a tire tread must meet a large number of technical demands, which are frequently contradictory, including low rolling resistance, high wear resistance and a high level of grip in particular on wet or damp roads.

These compromises of properties, in particular from the point of view of rolling resistance, have been improved in recent years on "Green Tires" of low energy consumption, which are intended in particular for passenger vehicles, owing to the use of new rubber compositions of low hysteresis having the characteristic of being reinforced majoritarily with specific inorganic fillers referred to as "reinforcing fillers", which are capable of rivalling conventional tire-grade carbon blacks from the reinforcing ability point of view.

Thus, nowadays, these reinforcing inorganic fillers are gradually replacing conventional carbon blacks in the treads of tires.

However, in all cases a small quantity of carbon black, generally within a range from 5 to 10 or 20 phr (parts by weight per hundred parts of elastomer) continues to be used: within the ranges indicated, it is known that there is a benefit to be had from the colouring properties (black pigmentation agent) and anti-UV properties of the carbon blacks, without furthermore adversely affecting the typical performance provided by the reinforcing inorganic filler, namely low hysteresis and improved grip on wet, snow-covered or icy ground. To illustrate this prior art, mention will be made for example of the following patents or patent applications FR 2797636 (or GB 2354246), EP 890606 (or U.S. Pat. No. 6,008,295), EP 1092565 (or U.S. Pat. No. 6,581,659), US2002/0151640, WO 01/96442 (or US2003/0191225), WO 02/10269, WO 02/22728, WO 02/30939, WO 02/31041, WO 02/053634, WO 02/066519, WO 02/083782, WO 02/088238, WO 03/002648, WO 03/002649, WO 2003/16387 and WO 2004/088238.

Now, the Applicants have discovered that the compromises of properties previously mentioned could be distinctly improved still further, from the point of view of grip on wet or damp ground, by reducing the quantity of carbon black present in the rubber compositions of the treads to a very small amount.

Consequently, a first subject of the invention relates to a fire tread comprising a rubber composition based on at least a diene elastomer, a reinforcing inorganic filler, an inorganic filler/elastomer coupling agent and a carbon black, characterised in that the amount of carbon black is of between 0.05 and 2.0 phr (parts by weight per hundred parts of elastomer).

It has in fact been noted, surprisingly, that the reduction in the quantity of carbon black to this narrow range of concentration, in which the necessary function of a black coloration agent is still active but that of an anti-UV agent is not, after exposure to visible UV radiation (photo-oxidation) of the surface of the tread, resulted in a significant increase in grip on wet roads, resulting in particular in a significant reduction in braking distances.

The subject of the invention is also the use of such a tread for the manufacture of new tires or the retreading of worn tires.

The tread according to the invention is particularly suited to tires intended to be fitted on passenger vehicles, vans, SUVs ("Sport Utility Vehicles"), 4×4 vehicles (having 4 driving wheels), two-wheeled vehicles (in particular motorcycles), "heavy vehicles" (that is to say subway trains, buses, road transport machinery (lorries, tractors, trailers), off-road vehicles), aircraft and construction, agricultural or handling machinery.

The subject of the invention is also these tires themselves when they comprise a tread according to the invention.

The invention relates to treads and tires, both in the uncured state (i.e. before curing) and in the cured state (i.e. after cross-linking or vulcanisation), both before and after photo-oxidation treatment.

Another subject of the invention is a process for preparing a tire tread liable to have, after photo-oxidation of its surface, improved grip on wet ground, this process being characterised in that it comprises the following steps:
  incorporating in a diene elastomer, in a mixer:
    a reinforcing inorganic filler;
    an inorganic filler/diene elastomer coupling agent;
    between 0.05 and 2.0 phr of carbon black,
    by thermomechanically kneading the entire mixture, in one or more stages, until a maximum temperature of between 130° C. and 200° C. is reached;
  cooling the entire mixture to a temperature of less than 100° C.;
  then incorporating:
    a vulcanisation system;
    kneading the entire mixture until a maximum temperature less than 120° C. is reached;
    extruding or calendering the rubber composition thus obtained, in the form of a tire tread.

The invention and its advantages will be readily understood in the light of the description and the examples of embodiment which follow.

I. MEASUREMENTS AND TESTS USED

The treads and rubber compositions constituting these treads are characterised, before and after curing, as indicated hereafter.

I-1. Mooney Plasticity

An oscillating consistometer such as described in French Standard NF T 43-005 (November 1980) is used. The Mooney plasticity is measured in accordance with the following principle: the composition in the uncured state (i.e. before curing or vulcanisation) is moulded in a cylindrical enclosure heated to 100° C. After one minute's preheating, the rotor turns within the test piece at 2 rpm, and the torque used for maintaining this movement is measured after four minutes' rotation. The Mooney plasticity (ML 1+4) is expressed in "Mooney units" (MU, with 1 MU=0.83 Newton·meter).

I-2. Tensile Tests

These tensile tests make it possible to determine the elasticity stresses and the properties at break. Unless indicated otherwise, they are effected in accordance with French Standard NF T 46-002 of September 1988. The nominal secant moduli (or apparent stresses, in MPa) at 10% elongation (M10), 100% elongation (M100) and 300% elongation (M300) are measured in a second elongation (i.e. after a cycle of accommodation to the amount of extension provided for the measurement itself).

The breaking stresses (in MPa) and the elongations at break (in %) are also measured. All these tensile measurements are effected under normal conditions of temperature (23±2° C.) and humidity (50±5% relative humidity), in accordance with French Standard NF T 40-101 (December 1979).

I-3. Tests on Tires (Braking on Wet Roads)

The tires are mounted on an automobile fitted with an ABS braking system and the distance necessary to go from 50 km/h to 10 km/h upon sudden braking on wetted ground (asphalt concrete) is measured. A value greater than that of the control, which is arbitrarily set to 100, indicates an improved result, that is to say a shorter braking distance.

II. DETAILED DESCRIPTION OF THE INVENTION

The treads according to the invention are formed, at least for their superficial part which is intended to come into contact with the road, of a rubber composition based on at least: (i) a (at least one) diene elastomer; (ii) a (at least one) inorganic filler as reinforcing filler; (iii) a (at least one) coupling agent providing the bond between the reinforcing inorganic filler and the diene elastomer; (iv) a (at least one) carbon black in a very small quantity, of between 0.05 and 2.0 phr.

Of course, the expression composition "based on" is to be understood to mean a composition comprising the mix and/or the reaction product of the various constituents used, some of these base constituents (for example, the coupling agent) being liable to, or intended to, react together, at least in part, during the different phases of manufacture of the treads, in particular during the vulcanisation (curing) thereof.

In the present description, unless expressly indicated otherwise, all the percentages (%) indicated are mass %.

II-1. Diene Elastomer

"Diene" elastomer or rubber is generally understood to mean an elastomer resulting at least in part (i.e. a homopolymer or a copolymer) from diene monomers (monomers bearing two double carbon-carbon bonds, whether conjugated or not).

The diene elastomers, in known manner, may be classed in two categories: those referred to as "essentially unsaturated" and those referred to as "essentially saturated". "Essentially unsaturated" diene elastomer is understood to mean a diene elastomer resulting at least in part from conjugated diene monomers, having a content of members or units of diene origin (conjugated dienes) which is greater than 15% (mole %). Thus, for example, diene elastomers such as butyl rubbers or copolymers of dienes and of alpha-olefins of the EPDM type do not fall within this definition, and may on the contrary be described as "essentially saturated" diene elastomers (low or very low content of units of diene origin which is always less than 15%). Within the category of "essentially unsaturated" diene elastomers, "highly unsaturated" diene elastomer is understood to mean in particular a diene elastomer having a content of units of diene origin (conjugated dienes) which is greater than 50%.

These general definitions being given, the person skilled in the art of tires will understand that the present invention is preferably used with highly unsaturated diene elastomers, in particular with:
(a) any homopolymer obtained by polymerisation of a conjugated diene monomer having 4 to 12 carbon atoms;
(b) any copolymer obtained by copolymerisation of one or more conjugated dienes together or with one or more vinyl-aromatic compounds having 8 to 20 carbon atoms.

Suitable conjugated dienes are, in particular, 1,3-butadiene, 2-methyl-1,3-butadiene, 2,3-di($C_1$-$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstirene, the commercial mixture "vinyltoluene", para-tert. butylstirene, methoxystirenes, chlorostirenes, vinylmesitylene, divinylbenzene and vinylnaphthalene.

The copolymers may contain between 99% and 20% by weight of diene units and between 1% and 80% by weight of vinyl-aromatic units. The elastomers may have any microstructure, which is a function of the polymerisation conditions used, in particular of the presence or absence of a modifying and/or randomising agent and the quantities of modifying and/or randomising agent used. The elastomers may for example be block, statistical, sequential or microsequential elastomers, and may be prepared in dispersion or in solution; they may be coupled and/or starred or alternatively functionalised with a coupling and/or starring or functionalising agent.

Preferred are polybutadienes, and in particular those having a content of 1,2-units of between 4% and 80%, or those having a content of cis-1,4 of more than 80%, polyisoprenes, butadiene/stirene copolymers, and in particular those having a stirene content of between 5% and 50% by weight and, more particularly, between 20% and 40%, a content of 1,2-bonds of the butadiene fraction of between 4% and 65%, and a content of trans-1,4 bonds of between 20% and 80%, butadiene/isoprene copolymers and in particular those having an isoprene content of between 5% and 90% by weight and a glass transition temperature (Tg, measured in accordance with ASTM D3418-82) of from −40° C. to −80° C., isoprene/stirene copolymers and in particular those having a stirene content of between 5% and 50% by weight and a Tg of between −25° C. and −50° C. In the case of butadiene/stirene/isoprene copolymers, those which are suitable are in particular those having a stirene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2- plus 3,4-units of the isoprene fraction of between 5% and 70%, and a content of trans-1,4 units of the isoprene fraction of between 10% and 50%, and more generally any butadiene/stirene/isoprene copolymer having a Tg of between −20° C. and −70° C.

In summary, particularly preferably, the diene elastomer of the composition according to the invention is selected from the group of (highly unsaturated) diene elastomers which consists of polybutadienes (BR), synthetic polyisoprenes (IR), natural rubber (NR), butadiene copolymers, isoprene copolymers and mixtures of these elastomers. Such copolymers are more preferably selected from the group which consists of butadiene/stirene copolymers (SBR), isoprene/butadiene copolymers (BIR), isoprene/stirene copolymers (SIR), isoprene/butadiene/stirene copolymers (SBIR) and mixtures of such copolymers.

The tread according to the invention is preferably intended for a passenger-car tire. In such a case, the diene elastomer is preferably an SBR copolymer, in particular an SBR prepared in solution, preferably used in a mixture with a polybutadiene; more preferably, the SBR has a content of stirene of between 20% and 30% by weight, a content of vinyl bonds of the butadiene fraction of between 15% and 65%, a content of trans-1,4 bonds of between 15% and 75% and a Tg of between −20° C. and −55° C., and the polybutadiene has more than 90% cis-1,4 bonds.

In the case of a tire for a heavy vehicle, the diene elastomer is preferably an isoprene elastomer, that is to say an isoprene homopolymer or copolymer, in other words a diene elastomer selected from among the group consisting of natural rubber (NR), synthetic polyisoprenes (IR), the various isoprene copolymers or a mixture of these elastomers. Of the isoprene copolymers, mention will be made in particular of isobutene/isoprene copolymers (butyl rubber-IIR), isoprene/stirene copolymers (SIR), isoprene/butadiene copolymers (BIR) or isoprene/butadiene/stirene copolymers (SBIR). This isoprene elastomer is preferably natural rubber or a synthetic cis-1,4 polyisoprene; of these synthetic polyisoprenes, preferably polyisoprenes having a content (mole %) of cis-1,4 bonds greater than 90%, more preferably still greater than 98%, are used. For such a tire for a heavy vehicle, the diene elastomer may also be constituted, in its entirety or in part, of another highly unsaturated elastomer such as, for example, an SBR elastomer.

The compositions of the treads of the invention may contain a single diene elastomer or a mixture of several diene elastomers, the diene elastomer(s) possibly being used in association with any type of synthetic elastomer other than a diene one, or even with polymers other than elastomers, for example thermoplastic polymers.

II-2. Reinforcing Inorganic Filler

"Reinforcing inorganic filler" is to be understood here, in known manner, to mean any inorganic or mineral filler, whatever its colour and its origin (natural or synthetic), also referred to as "white" filler, "clear" filler or alternatively "non-black" filler, in contrast to carbon black, this inorganic filler being capable, on its own, without any other means than an intermediate coupling agent, of reinforcing a rubber composition intended for the manufacture of a tire tread, in other words which is capable of replacing a conventional tire-grade carbon black for treads in its reinforcement function; such a filler is generally characterised, in known manner, by the presence of hydroxyl (—OH) groups at its surface.

Preferably, the reinforcing inorganic filler is a filler of the siliceous or aluminous type, or a mixture of these two types of fillers.

The silica ($SiO_2$) used may be any reinforcing silica known to the person skilled in the art, in particular any precipitated or fumed silica having a BET surface area and a specific CTAB surface area both of which are less than 450 $m^2/g$, preferably from 30 to 400 $m^2/g$. Highly dispersible precipitated silicas (referred to as "HDS") are preferred, in particular when the invention is used for the manufacture of tires having a low rolling resistance; as examples of such silicas, mention may be made of the silicas Ultrasil 7000 from Degussa, the silicas Zeosil 1165 MP, 1135 MP and 1115 MP from Rhodia, the silica Hi-Sil EZ150G from PPG, and the silicas Zeopol 8715, 8745 or 8755 from Huber.

The reinforcing alumina ($Al_2O_3$) preferably used is a highly dispersible alumina having a BET surface area of from 30 to 400 $m^2/g$, more preferably between 60 and 250 m 2/g, and an average particle size at most equal to 500 nm, more preferably at most equal to 200 nm. Non-limiting examples of such reinforcing aluminas are in particular the aluminas "Baikalox A125" or "CR125" (from Baikowski), "APA-100RDX" (Condea), "Aluminoxid C" (from Degussa) or "AKP-G015" (Sumitomo Chemicals).

By way of other examples of inorganic filler capable of being used in the rubber compositions of the treads of the invention, mention may also be made of the aluminium (oxide-)hydroxides, the titanium oxides or reinforcing silicon carbides (see for example applications WO 99/28376, WO 00/73372, WO 02/053634).

When the treads of the invention are intended for tires of low rolling resistance, the reinforcing inorganic filler used, in particular if it is silica, preferably has a BET surface area of between 60 and 350 $m^2/g$. One advantageous embodiment of the invention consists of using a reinforcing inorganic filler, in particular a silica, having a large BET specific surface area, within a range from 130 to 300 $m^2/g$, owing to the recognised high reinforcing ability of such fillers. According to another preferred embodiment of the invention, a reinforcing inorganic filler, in particular a silica, having a BET specific surface area of less than 130 $m^2/g$, and preferably in such a case of between 60 and 130 $m^2/g$ (see for example aforementioned applications WO03/002648 and WO03/002649) can be used.

The physical state in which the reinforcing inorganic filler is present is immaterial, whether it be in the form of a powder, microbeads, granules, balls or any other densified form. Of course, "reinforcing inorganic filler" is also understood to mean mixtures of different reinforcing inorganic fillers, in particular of highly dispersible siliceous and/or aluminous fillers such as described above.

The person skilled in the art will be able to adapt the amount of reinforcing inorganic filler according to the nature of the inorganic filler used and the type of tire in question, for example motorcycle tire, passenger-vehicle tire or alternatively a tire for utility vehicles such as vans or heavy vehicles. However, preferably, this amount of reinforcing inorganic filler will be selected to be greater than 50 phr, in particular between 60 and 140 phr, more preferably still within a range from 70 to 130 phr in particular when the tread is intended for a passenger-car tire.

In the present specification, the BET specific surface area is determined in known manner by adsorption of gas using the method of Brunauer-Emmett-Teller described in "*The Journal of the American Chemical Society*" Vol. 60, page 309, February 1938, more precisely in accordance with French Standard NF ISO 9277 of December 1996 [multipoint volumetric method (5 points)—gas: nitrogen—degassing: 1 hour at 160° C.—range of relative pressure p/po: 0.05 to 0.17]. The CTAB specific surface area is the external surface area determined in accordance with French Standard NF T 45-007 of November 1987 (method B).

II-3. Coupling Agent

In known manner, in the presence of a reinforcing inorganic filler, it is necessary to use a coupling agent or bonding agent, the function of which is to provide a sufficient chemical and/or physical connection between the inorganic filler (surface of its particles) and the diene elastomer.

Such a coupling agent, which is consequently at least bifunctional, has, for example, the simplified general formula "Y—T—X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the diene elastomer, for example by means of a sulphur atom;

T represents a divalent group making it possible to link Y and X.

The coupling agents must particularly not be confused with simple agents for coating the inorganic filler which, in known manner, may comprise the function Y which is active with respect to the inorganic filler but are devoid of the function X which is active with respect to the elastomer.

Silica/diene elastomer coupling agents, of variable effectiveness, have been described in a very large number of documents and are well-known to the person skilled in the art. Any coupling agent likely to ensure, in the diene rubber compositions usable for the manufacturing of tire treads, the effective bonding between a reinforcing inorganic filler such as silica and a diene elastomer, in particular organosilanes or polyfunctional polyorganosiloxanes bearing the functions X and Y, may be used.

In particular polysulphurised silanes, which are referred to as "symmetrical" or "asymmetrical" depending on their specific structure, are used, such as those described for example in the aforementioned applications WO03/002648 and WO03/002649.

Particularly suitable for implementing the invention, without the definition below being limitative, are what are called "symmetrical" polysulphurised silanes which satisfy the following general formula (I):

$$Z\text{—}A\text{—}S_n\text{—}A\text{—}Z, \text{ in which:} \quad (I)$$

n is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$ alkylenes, notably $C_1$-$C_4$ alkylenes, in particular propylene);

Z corresponds to one of the formulae below:

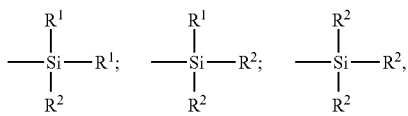

in which:

the radicals $R^1$, which may or may not be substituted, and may be identical or different, represent a $C_1$-$C_{18}$ alkyl group, a $C_5$-$C_{18}$ cycloalkyl group or a $C_6$-$C_{18}$ aryl group, (preferably $C_1$-$C_6$ alkyl groups, cyclohexyl or phenyl, in particular $C_1$-$C_4$ alkyl groups, more particularly methyl and/or ethyl), the radicals $R^2$, which may or may not be substituted, and may be identical or different, represent a $C_1$-$C_{18}$ alkoxyl group or a $C_5$-$C_{18}$ cycloalkoxyl group (preferably a group selected from among $C_1$-$C_8$ alkoxyls and $C_5$-$C_8$ cycloalkoxyls, more preferably still a group selected from among $C_1$-$C_4$ alkoxyls, in particular methoxyl and ethoxyl).

In the case of a mixture of polysulphurised alkoxysilanes in accordance with Formula (I) above, in particular conventional, commercially available, mixtures, the average value of the "n"s is a fractional number, preferably between 2 and 5, more preferably close to 4. However, the invention may also be implemented advantageously for example with disulphurised alkoxysilanes (n=2).

As examples of polysulphurised silanes, mention will be made more particularly of the polysulphides (in particular disulphides, trisulphides or tetrasulphides) of bis-(($C_1$-$C_4$) alkoxyl-($C_1$-$C_4$)alkylsilyl-($C_1$-$C_4$)alkyl), such as for example bis(3-trimethoxysilylpropyl) or bis(3-triethoxysilylpropyl) polysulphides. Of these compounds, in particular bis(3-triethoxysilylpropyl) tetrasulphide, abbreviated TESPT, of the formula $[(C_2H_5O)_3Si(CH_2)_3S_2]_2$, or bis(triethoxysilylpropyl) disulphide, abbreviated TESPD, of the formula $[(C_2H_5O)_3Si(CH_2)_3S]_2$, are used.

TESPD is sold, for example, by Degussa under the name Si75 (in the form of a mixture of disulphide—75% by weight—and of polysulphides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulphides having an average value of n which is close to 4).

Mention will also be made, as examples of advantageous coupling agents, of the polysulphides (in particular disulphides, trisulphides or tetrasulphides) of bis-(mono($C_1$-$C_4$) alkoxyl-di($C_1$-$C_4$)alkylsilylpropyl), more particularly bis-monoethoxydimethylsilylpropyl tetrasulphide as described in the aforementioned application WO02/083782.

As examples of coupling agents other than the aforementioned polysulphurised alkoxysilanes, mention will be made in particular of the bifunctional polyorganosiloxanes, or alternatively the hydroxysilane polysulphides ($R^2$=OH in Formula I above) such as described in the aforementioned applications WO 02/30939 et WO 02/31041.

In the treads according to the invention, the content of coupling agent is preferably between 2 and 15 phr, more preferably between 4 and 12 phr (for example between 4 and 8 phr). However, it is generally desirable to use as little as possible thereof. Relative to the weight of reinforcing inorganic filler, the amount of coupling agent typically represents between 0.5 and 15% by weight relative to the quantity of reinforcing inorganic filler. In the case for example of tire treads for passenger vehicles, the coupling agent is used in a preferred amount of less than 12%, or even less than 10% by weight relative to this quantity of reinforcing inorganic filler.

The coupling agent could be grafted beforehand (via the "X" function) on to the diene elastomer of the composition of the invention, the elastomer thus functionalised or "pre-coupled" then comprising the free "Y" function for the reinforcing inorganic filler. The coupling agent could also be grafted beforehand (via the "Y" function) on to the reinforcing inorganic filler, the filler thus "precoupled" then being able to be bonded to the diene elastomer by means of the free "X" function. However, it is preferred, in particular for reasons of better processing of the compositions in the uncured state, to use the coupling agent either grafted onto the reinforcing inorganic filler, or in the free (i.e. non-grafted) state.

II-4. Carbon Black

The carbon black is used in an amount of between 0.05 and 2.0 phr, preferably between 0.05 and 1.5 phr, a narrow range within which the black retains its necessary function of a black coloration agent but no longer that of an anti-UV agent. For this reason, the amount of black is more preferably between 0.1 and 1.0 phr, even more preferably between 0.1 and 0.5 phr.

Suitable carbon blacks are all the carbon blacks capable of providing a black coloration to the rubber compositions, in particular the blacks of the type HAF, ISAF and SAF, which are known to the person skilled in the art and conventionally used in tires. Of the latter, mention may be made of the reinforcing carbon blacks of series (ASTM grades) 100, 200 or 300 used in the treads of these tires (for example N115, N134, N234, N326, N330, N339, N347, N375), but also those of the non-reinforcing type (because they are less structured) of the higher series 400 to 700 (for example the blacks N660, N683, N772). By way of example non-reinforcing blacks referred to as "ink blacks" used as black pigments in printing inks and paints could also be used.

The carbon blacks may be used in isolation, as available commercially, or in any other form, for example as supports for some of the rubber-making additives used.

II-5. Various Additives

The rubber compositions of the treads according to the invention may also comprise all or some of the additives usually used in elastomer compositions intended for the manufacture of treads, such as, for example, plasticisers or extender oils, whether the latter be aromatic or non-aromatic in nature, pigments, protective agents such as anti-ozone waxes, chemical antiozonants, antioxidants, anti-fatigue agents, reinforcing resins, methylene acceptors (for example novolac phenolic resin) or donors (for example HMT or H3M) such as described for example in the aforementioned application WO 02/10269, a cross-linking system based either on sulphur or on sulphur and/or peroxide and/or bis-maleimide donors, vulcanisation accelerators and vulcanisation activators.

Preferably, these compositions comprise, as preferred plasticising agent (non-aromatic or only very slightly aromatic), at least one compound selected from among the group consisting of naphthenic oils, paraffinic oils, MES oils, TDAE oils, glycerol esters (in particular trioleates), hydrocarbon plasticising resins preferably having a high value of Tg (preferably greater than 30° C.), and mixtures of such compounds.

These compositions may also contain, in addition to the coupling agents, coupling activators, agents (comprising for example the single Y function) for covering the reinforcing inorganic filler, or more generally processing aids liable, in known manner, owing to an improvement in the dispersion of the inorganic filler in the rubber matrix and to a reduction in the viscosity of the compositions, to improve their ability to be worked in the uncured state, these agents being, for example, hydrolysable silanes such as alkylalkoxysilanes (in particular alkyltriethoxysilanes), polyols, polyethers (for example polyethylene glycols), primary, secondary or tertiary amines (for example trialkanolamines), hydroxylated or hydrolysable POS, for example $\alpha,\omega$-dihydroxypolyorganosiloxanes (in particular $\alpha,\omega$-dihydroxypolydimethylsiloxanes).

II-6. Manufacture of the Treads

The rubber compositions of the treads of the invention are manufactured in suitable mixers, using two successive preparation phases in accordance with a general procedure well-known to the person skilled in the art: a first phase of thermo-mechanical working or kneading (sometimes referred to as "non-productive" phase) at high temperature, up to a maximum temperature of between 130° C. and 200° C., preferably between 145° C. and 185° C., followed by a second phase of mechanical working (sometimes referred to as "productive" phase) at lower temperature, typically less than 120° C., for example between 60° C. and 100° C., during which finishing phase the cross-linking or vulcanisation system is incorporated.

The process according to the invention for preparing a tire tread according to the invention comprises the following steps:
  incorporating in a diene elastomer, in a mixer:
    a reinforcing inorganic filler;
    an inorganic filler/elastomer coupling agent providing the connection between the reinforcing inorganic filler and the diene elastomer;
    between 0.05 and 2.0 phr, preferably between 0.05 and 1.5 phr, of carbon black,
    by thermomechanically kneading the entire mixture, in one or more stages, until a maximum temperature of between 130° C. and 200° C. is reached;
  cooling the entire mixture to a temperature of less than 100° C.;
  then incorporating:
    a vulcanisation system;
    kneading the entire mixture until a maximum temperature less than 120° C. is reached;
    extruding or calendering the rubber composition thus obtained, in the form of a tire tread.

According to a preferred embodiment of the invention, all the base constituents of the compositions of the treads according to the invention, with the exception of the vulcanisation system, namely the reinforcing inorganic filler, the coupling agent and the carbon black are incorporated intimately by kneading in the diene elastomer during the first, so-called non-productive, phase, that is to say that at least these different base constituents are introduced into the mixer and are kneaded thermomechanically, in one or more stages, until the maximum temperature of between 130° C. and 200° C., preferably between 145° C. and 185° C., is reached.

By way of example, the first (non-productive) phase is effected in a single thermomechanical step during which all the necessary constituents, any additional coating agents or processing agents and various other additives, with the exception of the vulcanisation system, are introduced into a suitable mixer, such as a conventional internal mixer. A second stage of thermomechanical working may possibly be added, in this internal mixer, for example after an intermediate cooling stage (preferably to a temperature of less than 100° C.), with the aim of making the compositions undergo complementary heat treatment, in particular in order to improve the dispersion, in the elastomeric matrix, of the reinforcing inorganic filler and its coupling agent. The total duration of the kneading, in this non-productive phase, is preferably between 1 and 15 minutes.

After cooling the mixture thus obtained during the first non-productive phase, the vulcanisation system is then incorporated at low temperature, generally in an external mixer such as an open mill; the entire composition is then mixed (productive phase) for several minutes, for example between 2 and 15 minutes.

The vulcanisation system proper is preferably based on sulphur and a primary vulcanisation accelerator, in particular an accelerator of the sulphenamide type. To this vulcanisation system there are added, incorporated during the first non-productive phase and/or during the productive phase, various known secondary accelerators or vulcanisation activators such as zinc oxide, stearic acid, guanidine derivatives (in particular diphenylguanidine), etc. The amount of sulphur is preferably between 0.5 and 3.0 phr, and the amount of the primary accelerator is preferably between 0.5 and 5.0 phr.

The final composition thus obtained is then calendered, for example in the form of a film or a sheet, in particular for characterisation in the laboratory, or alternatively extruded in the form of a rubber profiled element usable directly as a tire tread.

The vulcanisation (or curing) is carried out in known manner at a temperature generally between 130° C. and 200° C., for a sufficient time which may vary, for example, between 5 and 90 minutes, depending, in particular, on the curing temperature, the vulcanisation system adopted and the vulcanisation kinetics of the composition in question.

As explained previously and illustrated by the following examples of embodiment, a final step of photo-oxidation of the surface of the tread, which completes the steps previously described, imparts to the latter significantly improved grip on wet or damp ground.

This supplementary step may consist of simple natural exposure to visible UV radiation or artificial ageing, for example using one or more lamp(s) which emit(s) in the visible-UV range (e.g. mercury vapour lamp, xenon lamp, fluorescent lamp, metal halide lamps), or alternatively in an accelerated photo-ageing enclosure which may comprise one or more of said lamps.

In the process according to the invention, preferably at least one, more preferably all, of the following characteristics are satisfied:

- the quantity of reinforcing inorganic filler is greater than 50 phr;
- the quantity of coupling agent is between 2 and 15 phr;
- the maximum thermomechanical kneading temperature is between 145° C. and 180° C.;
- the reinforcing inorganic filler is a siliceous or aluminous filler;
- the quantity of carbon black is between 0.1 and 1 phr;
- the at least bifunctional coupling agent is an organosilane or a polyorganosiloxane;
- the diene elastomer is a butadiene/stirene copolymer (SBR), preferably used in a mixture with a polybutadiene.

More preferably, in this process, at least one, even more preferably all, of the following characteristics are satisfied:

- the quantity of inorganic filler is of between 60 and 140 phr, in particular within a range from 70 to 130 phr;
- the quantity of coupling agent is of between 4 and 12 phr, in particular between 4 and 8 phr;
- the reinforcing inorganic filler is silica;
- the quantity of carbon black is between 0.1 and 0.5 phr;
- the coupling agent is a bis-$(C_1$-$C_4)$alkoxysilylpropyl or bis-hydroxysilylpropyl polysulphide;
- the SBR is an SBR prepared in solution and the polybutadiene has more than 90% cis-1,4 bonds.

The rubber compositions previously described, based on diene elastomer, reinforcing inorganic filler, a coupling agent and carbon black in a very small quantity, may constitute the entire tread or only part of the tread according to the invention.

The invention applies in particular to those cases in which these rubber compositions comprising the very small amount of carbon black form solely part of the tread of the invention, in particular only the surface part of the latter (including the lateral walls of the motifs in relief of the tread pattern) which is intended to come into contact with the ground during travel of the tire, at one moment or another during the life of the latter, that is to say said tire either when new or in a state of partial wear.

Thus, by way of example, in a tread of the composite type formed for example of two radially superposed layers (what is called a "cap-base" structure), both intended to come into contact with the road during travel of the tire, the part comprising the very small amount of carbon black may form the radially outer layer of the tread in contact with the ground from the start of rolling of the new tire, or on the contrary its radially inner layer which is intended to come into contact with the ground later, in the event that it might be desired, for example, to "delay" the technical effect provided by the invention, thus compensating for the loss of grip on wet ground resulting from partial wear of the tread (reduction in depth of relief of the tread pattern).

The invention relates to the treads previously described, and to the tires comprising these treads, both in the uncured state (i.e. before curing) and in the cured state (i.e. after cross-linking or vulcanisation), before and after photo-oxidation treatment.

III. EXAMPLES OF EMBODIMENT OF THE INVENTION

III-1. Preparation of the Rubber Compositions and Treads

For the following tests, the procedure is as follows: the reinforcing inorganic filler (silica), the carbon black, the coupling agent, the diene elastomer or the mixture of diene elastomers, and the various other ingredients, with the exception of the vulcanisation system, are introduced in succession into an internal mixer filled to 70% of capacity, the initial tank temperature of which is approximately 60° C. Thermomechanical working (non-productive phase) is then performed in one stage, of a duration of about 3 to 4 minutes in total, until a maximum "dropping" temperature of 165° C. is obtained.

The mixture thus obtained is recovered, it is cooled and then sulphur and sulphenamide accelerator are incorporated on an external mixer (homo-finisher) at 30° C., by mixing everything (productive phase) for an appropriate time, of between 5 and 12 minutes, depending on the case.

The compositions thus obtained are then calendered either in the form of plates (thickness of 2 to 3 mm) or of thin sheets of rubber in order to measure their physical or mechanical properties, or extruded directly in the form of treads for passenger-car tires.

III-2. Tests

A) Test 1

In this first test, two compositions are compared, based on known SBR and BR diene elastomers, reinforced by silica and comprising a small or very small quantity of carbon black.

These two compositions, which are intended to form tire treads for passenger vehicles, are referred to here as C-1 and C-2 and are essentially distinguished by the quantity of carbon black which they contain:

C-1 (according to the prior art): 6 phr of carbon black;
C-2 (according to the invention): 0.3 phr of carbon black.

In composition C-1, the carbon black is used, in the amount of 6 phr indicated, both as a black pigmentation agent and as an anti-UV agent, in accordance with the teaching of the prior art.

In composition C-2, although the carbon black in the very small amount which is used still fulfils its function of a black pigmentation agent, it no longer fulfils that of an effective anti-UV agent. Composition C-2 thus has a very low resistance to photo-oxidation, in other words high photo-oxidisability which is assumed a posteriori—this at least is what tests No. 2 and No. 3 below seem to indicate—to be beneficial to grip on wet roads.

Tables 1 and 2 show the formulation of the different compositions (Table 1—amounts of the different products expressed in phr), and their properties before and after curing (45 min at 150° C.).

Examining the different results of Table 2 does not reveal any significant difference between the properties of the two compositions, either from the point of view of their processing ability in the uncured state (Mooney plasticity) or of their mechanical properties (moduli, ratio of the moduli ME300/ME100, a known indicator of the level of reinforcement, properties at break), as the person skilled in the art might have expected, taking into account the very great similarity between the two compositions tested.

B) Test 2

The compositions C-1 and C-2 previously described are then used as treads for radial-carcass passenger-car tires, of dimension 195/65 R15 (speed index H), which are conventionally manufactured and vulcanised, and identical in all points except for the rubber composition constituting the tread.

These tires are referred to as P-1 and P-2; half of them were subjected to UV ageing (natural exposure to visible ultraviolet radiation) for three days. For this UV treatment, the tires were exposed outside, in a static position, in a southerly orientation (sunny Mediterranean site with average daytime temperature of 15° C.), these tires being rotated about their axe by ⅓ of a turn each day, so as to expose their treads completely.

All the tires were then mounted on a passenger vehicle in order to be subjected to the braking test on wet roads described in section 1-3 above. The specific conditions of the test are as follows: vehicle: Renault Laguna (front and rear pressure: 2.0 bar); tires tested mounted at the front of the vehicle.

The results of the braking test are set forth in Table 3, in relative units ("r.u."—base 100 used for the control tire P-1 before UV ageing).

Only the tire of the invention P-2, after and only after UV exposure, exhibits a reduction in the braking distance: a gain of approximately 11% is recorded. The UV ageing on the other hand has no effect on the performance of the control tire.

A series of six successive braking operations, performed on the same Laguna fitted with the "photo-oxidised" tires P-2, demonstrates (see results of Table 4) the durability of the technical effect observed, with the gain being maintained at around 10-15% for each successive braking operation.

This behaviour, which was in no way anticipated from the rubber properties of Test 1 above, is both remarkable and unexpected. Such a result is equivalent to a reduction in the braking distance of 5.0 to 7.5 m relative to a nominal distance (starting reference) which would be for example of 50 m, which is of course very significant.

C) Test 3

The above tests were repeated, and their results confirmed, on three new elastomeric compositions C-3 to C-5, of formulations close to those of the previous ones C-1 and C-2 (see appended Table 5):

C-3 (according to the prior art): 6 phr of carbon black;
C-4 (according to the invention): 0.3 phr of carbon black;
C-5 (according to the invention): 0.3 phr of carbon black.

Composition C-3 is identical to the previous control composition C-1. Compositions C-4 and C-5 differ from the previous composition C-2 by a modification of the plasticising system, the aromatic oil being replaced by a combination of hydrocarbon plasticising resin of high Tg and either MES oil for composition C-4, or oleic sunflower oil for composition C-5.

The three compositions were tested as passenger-car tire treads, as previously for Test No. 2, apart from the following two differences:

firstly the treads were subjected to a far shorter photo-oxidation treatment (12 hours, instead of 3 days previously with natural ageing) due to the use of an accelerated photo-ageing enclosure;

secondly the treatment was carried out on the treads in the uncured state, that is to say before the final curing operation.

The photo-ageing enclosure used was equipped with 4 visible UV high-pressure Hg vapour lamps, delivering between 300 and 400 nm a total output of approximately 60 $W/m^2$, located at a distance of approximately 15 cm from the surface to be treated.

The corresponding tires, P-3 to P-5, after UV treatment or not of their treads, then curing, were subjected to the braking test of section I-3.

The results are summarised in the appended Table 6, in relative units, the base 100 being used for the control tire P-3 without visible UV ageing.

It is noted first of all that the plasticising system of compositions C-4 and C-5 (devoid of aromatic oil) is already beneficial to the grip of the tires P4 and P-5, even without UV treatment, since a gain of 2% is recorded compared with the control compositions and tires (C-3 and P-3). Such an effect is known to the person skilled in the art (see for example aforementioned applications WO02/088238, WO2004/022644).

However, only the tires according to the invention P-4 and P-5, the treads of which underwent the visible UV treatment, exhibit a very significant reduction in the braking distance, with an average gain of 12% for the fires P-4 (plasticising system based on hydrocarbon resin and MES oil) and of 14% for the tires P-5 (plasticising system based on hydrocarbon resin and oleic sunflower oil), relative to the reference used (control tires P-3).

It is confirmed that the visible UV ageing on the other hand has no effect on the braking performance of the control tires P-3 the tread of which comprises a conventional amount (6 phr) of carbon black.

As previously for Test No. 2, a series of six successive braking operations demonstrates, for each tire according to the invention (P-4 and P-5), the long-lived effect of the invention, with the average gain being maintained at around 11-12% upon each successive braking operation (see Table 7).

In conclusion, the invention makes it possible to improve, completely significantly and unexpectedly, the grip performance on wet ground of the tires comprising treads according to the invention.

What is more, this result is obtained while maintaining the performances of rolling resistance and of wear resistance at the high levels that one is entitled to expect nowadays of rubber compositions reinforced with inorganic fillers such as highly dispersible silicas.

It is supposed that this improved grip could be linked to a very superficial and localised oxidised surface state of the tread, which is beneficial to better gripping of the tire on wet ground, obtained after photo-oxidation of said tread, such photo-oxidation being made possible only due to the very small quantity of carbon black which is used.

Such photo-oxidising treatment, in particular under visible UV radiation, may be performed during the manufacture of the treads or tires itself, in the uncured state or after vulcanisation, or even later on. It could be performed for example at a regular frequency on treads which have already undergone partial wear, during the life of the tires and according to the particular use of the latter, in order to re-impart thereto, to some extent "on demand", improved grip on wet ground.

TABLE 1

| | Composition No.: | |
|---|---|---|
| | C-1 | C-2 |
| SBR (1) | 70 | 70 |
| BR (2) | 30 | 30 |
| carbon black (3) | 6 | — |
| carbon black (4) | — | 0.3 |
| silica (5) | 80 | 80 |
| coupling agent (6) | 6.4 | 6.4 |
| plasticiser (7) | 33.3 | 33.3 |
| DPG (8) | 1.5 | 1.5 |
| ZnO | 2.5 | 2.5 |
| stearic acid | 2 | 2 |
| anti-ozone wax | 1.5 | 1.5 |
| antioxidant (9) | 1.9 | 1.9 |
| sulphur | 1.1 | 1.1 |
| accelerator (10) | 2.0 | 2.0 |

(1) SBR (expressed as dry SBR) extended with 18% by weight (12.6 phr) of oil (or a total of 82.6 phr of extended SBR); 25% stirene, 58% 1,2-polybutadiene units and 23% trans-1,4-polybutadiene units (Tg = −24° C.);
(2) BR with 4.3% of 1-2; 2.7% of trans; 93% of cis 1,4 (Tg = −106° C.);
(3) carbon black N234;
(4) carbon black N772;
(5) silica "Zeosil 1165 MP" from Rhodia, type "HDS" - (BET and CTAB: approximately 160 m$^2$/g);
(6) TESPT coupling agent ("Si69" from Degussa);
(7) total aromatic oil (including extender oil for the SBR);
(8) diphenylguanidine (Perkacit DPG from Flexsys);
(9) N-1,3-dimethylbutyl-N-phenylparaphenylenediamine (Santoflex 6-PPD from Flexsys);
(10) N-cyclohexyl-2-benzothiazyl sulphenamide (Santocure CBS from Flexsys).

TABLE 2

| | Composition No.: | |
|---|---|---|
| | C-1 | C-2 |
| Properties before curing: | | |
| Mooney (MU) | 99 | 92 |
| Properties after curing: | | |
| ME10 (MPa) | 7.3 | 5.3 |
| ME100 (MPa) | 2.2 | 1.8 |
| ME300 (MPa) | 2.3 | 2.0 |
| ME300/ME100 | 1.05 | 1.11 |
| Breaking stress (MPa) | 19.5 | 18.3 |
| Elongation at break (%) | 520 | 530 |

TABLE 3

| | Tire: | |
|---|---|---|
| | P-1 (prior art) | P-2 (invention) |
| Before UV ageing | 100 | 100 |
| After UV ageing | 100 | 111 |

Braking performance (1$^{st}$ braking operation) on wet roads (in r.u.)

TABLE 4

| | No. of braking operation | | | | | |
|---|---|---|---|---|---|---|
| | 1 | 2 | 3 | 4 | 5 | 6 |
| Tire P-2 after UV ageing: | 111 | 110 | 114 | 112 | 112 | 111 |

Successive braking operations on wet roads (in r.u.)

TABLE 5

| | Composition No.: | | |
|---|---|---|---|
| | C-3 | C-4 | C-5 |
| SBR (1) | 70 | 70 | 70 |
| BR (2) | 30 | 30 | 30 |
| carbon black (3) | 6 | 0.3 | 0.3 |
| silica (5) | 80 | 80 | 80 |
| coupling agent (6) | 6.4 | 6.4 | 6.4 |
| plasticiser (7) | 33 | | |
| plasticiser (11) | | 13 | |
| plasticiser (12) | | | 17 |
| plasticiser (13) | | 15 | 11 |
| DPG (8) | 1.5 | 1.5 | 1.5 |
| ZnO | 2.5 | 2.5 | 2.5 |
| stearic acid | 2 | 2 | 2 |
| anti-ozone wax | 1.5 | 1.5 | 1.5 |
| antioxidant (9) | 1.9 | 1.9 | 1.9 |
| Sulphur | 1.1 | 1.1 | 1.1 |
| accelerator (10) | 2.0 | 2.0 | 2.0 |

(1) to (10): identical to Table 1;
(11) MES oil (total, including extender oil for the SBR - oil "Flexon 683", from Exxon Mobile);
(12) glycerol trioleate (including extender oil for the SBR - sunflower oil with 85% by weight oleic acid; - "Lubrirob Tod 1880" from Novance);
(13) plasticising hydrocarbon resin of high Tg (88° C.) (polyalphapinene resin "R2495" - from Hercules);

TABLE 6

| | Tire: | | |
|---|---|---|---|
| | P-3 (prior art) | P-4 (invention) | P-5 (invention) |
| Before UV ageing | 100 | 102 | 102 |
| After UV ageing | 100 | 112 | 114 |

Braking performance (1$^{st}$ braking operation) on wet roads (in r.u.)

TABLE 7

| | No. of braking operation: | | | | | |
|---|---|---|---|---|---|---|
| | 1 | 2 | 3 | 4 | 5 | 6 |
| Tire P-4 after UV ageing: | 112 | 108 | 114 | 115 | 110 | 109 |
| Tire P-5 after UV ageing: | 114 | 105 | 114 | 116 | 106 | 116 |

Successive braking operations on wet roads (in r.u.)

The invention claimed is:

1. A tire comprising a tread, wherein the tread comprises a rubber composition based on a diene elastomer, a reinforcing inorganic filler, an inorganic filler/elastomer coupling agent and carbon black, wherein the amount of carbon black is between 0.05 and 1.5 phr (parts by weight per hundred parts of elastomer).

2. The tire according to claim 1, wherein the diene elastomer is selected from the group which consists of polybutadienes, synthetic polyisoprenes, natural rubber, butadiene copolymers, isoprene copolymers and mixtures of these elastomers.

3. The tire according to claim 1, wherein the, reinforcing inorganic filler is a siliceous or aluminous filler.

4. The tire according to claim 1, wherein the quantity of reinforcing inorganic filler is greater than 50 phr.

5. The tire according to claim 4, wherein the quantity of reinforcing inorganic filler is between 60 and 140 phr.

6. The tire according to claim 1, wherein the coupling agent is a silane or a polysiloxane which is at least bifunctional.

7. The tire according to claim 1, wherein the amount of coupling agent is between 2 and 15 phr.

8. The tire according to claim 7, wherein the amount of coupling agent is between 4 and 12 phr.

9. The tire according to claim 1, wherein the amount of carbon black is between 0.1 and 1.0 phr.

10. The tire according to claim 1, wherein the amount of carbon black is between 0.1 and 0.5 phr.

11. The tire according to claim 2, wherein the diene elastomer is a butadiene/stirene copolymer (SBR).

12. The tire according to claim 11, wherein the SBR has a stirene content of between 20% and 30% by weight, a content of vinyl bonds of the butadiene fraction of between 15% and 65%, a content of trans-1,4 bonds of between 20% and 75% and a glass transition temperature of between −20° C. and −55° C.

13. The tire according to claim 11, wherein the SBR is a SBR prepared in solution.

14. The tire according to claim 13, wherein the SBR is used in a mixture with a polybutadiene.

15. The tire according to claim 1, wherein the rubber composition comprises as plasticizing agent a compound selected from among the group consisting of naphthenic oils, paraffinic oils, MES oils, TDAE oils, glycerol esters, hydrocarbon plasticizing resins and mixtures of such compounds.

16. The tire according to claim 15; wherein the amount of plasticizing agent is between 5 and 50 phi.

17. The tire according to claim 16, wherein the amount of plasticizing agent is between 10 and 40 phr.

18. The tire according to claim 1, wherein said tread is in the uncured (non-vulcanized) state.

19. The tire according to claim 1, wherein said tread is in the cured (vulcanized) state.

20. The tire according to claim 1, wherein said tread has undergone a photo-oxidation treatment.

21. The tire according to claim 20, wherein the photo-oxidation treatment is an accelerated visible-UV ageing treatment.

22. A process for preparing a tire tread having, after photo-oxidation of its surface, improved grip on wet roads, wherein said process comprises the steps of:
 (a) incorporating in a diene elastomer, in a mixer:
  a reinforcing inorganic filler;
  an inorganic filler/diene elastomer coupling agent;
  between 0.05 and 1.5 phr of carbon black,
  by thermomechanically kneading the entire mixture, in one or more stages, until a maximum temperature of between 130° C. and 200° C. is reached;
 (b) cooling the entire mixture to a temperature of less than 100° C.;
 (c) then incorporating a vulcanization system;
 (d) kneading the entire mixture until a maximum temperature less than 120° C. is reached; and
 (e) extruding or calendering the rubber composition thus obtained, in the form of a tire tread.

23. The process according to claim 22, wherein the diene elastomer is selected from among the group consisting of polybutadienes, synthetic polyisoprenes, natural rubber, butadiene copolymers, isoprene copolymers and mixtures of these elastomers.

24. The process according to claim 22, wherein the reinforcing inorganic filler is a siliceous or aluminous filler.

25. The process according to claim 22, wherein the quantity of reinforcing inorganic filler is greater than 50 phr.

26. The process according to claim 25, wherein the quantity of reinforcing inorganic filler is between 60 and 140 phr.

27. The process according to claim 22, wherein the coupling agent is a silane or a polysiloxane which is at least bifunctional.

28. The process according to claim 27, wherein the amount of coupling agent is between 2 and 15 phr.

29. The process according to claim 28, wherein the amount of coupling agent is between 4 and 12 phr.

30. The process according to claim 22, wherein the amount of carbon black is between 0.1 and 0.5 phr.

31. The process according to claim 22, wherein the diene elastomer is a butadiene/stirene copolymer (SBR).

32. The process according to claim 31, wherein the SBR has a stirene content of between 20% and 30% by weight, a content of vinyl bonds of the butadiene fraction of between 15% and 65%, a content of trans-1,4 bonds of between 20% and 75% and a glass transition temperature of between −20° C. and −55° C.

33. The process according to claim 32, wherein the SBR is a SBR prepared in solution.

34. The process according to claim 33, wherein the SBR prepared in solution is used in a mixture with a polybutadiene.

35. The process according to claim 22, wherein is further incorporated in the diene elastomer a plasticizing agent selected from among the group consisting of naphthenic oils, paraffinic oils, MES oils, TDAE oils, glycerol esters, hydrocarbon plasticizing resins and mixtures of such compounds.

36. The process according to claim 35, wherein the amount of plasticizing agent is between 5 and 50 phr.

37. The process according to claim 36, wherein the amount of plasticizing agent is between 10 and 40 phr.

38. The process according to claim 22, wherein said process is finished off by a step of photo-oxidation of the surface of the tread.

39. The process according to claim 38, wherein the photo-oxidation step is carried out before vulcanization of the tread.

40. The process according to claim 38, wherein the photo-oxidation step is carried out after vulcanization of the tread.

41. The process according to claim 38, wherein the photo-oxidation step is carried out using one or more visible UV lamp(s).

42. The process according to claim 41, wherein the photo-oxidation is carried out in an accelerated photo-ageing enclosure.

43. A tire comprising a tread, wherein the tread comprises a rubber composition based on a diene elastomer, a reinforcing inorganic filler, an inorganic filler/elastomer coupling agent and carbon black, wherein the amount of carbon black is between 0.05 and 2.0 phr (parts by weight per hundred parts of elastomer), and the tread has undergone a photo-oxidation treatment which is an accelerated visible-UV ageing treatment.

44. A process for preparing a tire tread having, after photo-oxidation of its surface, improved grip on wet roads, wherein said process comprises the steps of:
 (a) incorporating in a diene elastomer, in a mixer:
  a reinforcing inorganic filler;
  an inorganic filler/diene elastomer coupling agent;
  between 0.05 and 2.0 phr of carbon black, by thermomechanically kneading the entire mixture, in one or more stages, until a maximum temperature of between 130° C. and 200° C. is reached;
(b) cooling the entire mixture to a temperature of less than 100° C.;
(c) then incorporating a vulcanization system;
(d) kneading the entire mixture until a maximum temperature less than 120° C. is reached;
(e) extruding or calendering the rubber composition thus obtained, in the form of a tire tread; and
(f) finishing off said process by photo-oxidation of the surface of the tread, wherein the photo-oxidation step is carried out using one or more visible UV lamp(s) in an accelerated photo-ageing enclosure.

* * * * *